(12) United States Patent
Clüsserath

(10) Patent No.: US 10,179,725 B2
(45) Date of Patent: Jan. 15, 2019

(54) METHOD AND FILLING SYSTEM FOR FILLING CONTAINERS

(71) Applicant: KHS GmbH, Dortmund (DE)

(72) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 507 days.

(21) Appl. No.: 14/775,804

(22) PCT Filed: Sep. 28, 2013

(86) PCT No.: PCT/EP2013/002924
§ 371 (c)(1),
(2) Date: Sep. 14, 2015

(87) PCT Pub. No.: WO2014/139547
PCT Pub. Date: Sep. 18, 2014

(65) Prior Publication Data
US 2016/0023876 A1    Jan. 28, 2016

(30) Foreign Application Priority Data

Mar. 14, 2013   (DE) .................. 10 2013 102 616

(51) Int. Cl.
| | |
|---|---|
| *B67C 3/26* | (2006.01) |
| *B67C 3/10* | (2006.01) |
| *B67C 3/12* | (2006.01) |
| *G01F 1/58* | (2006.01) |
| *B67C 3/08* | (2006.01) |
| *G01M 3/32* | (2006.01) |

(52) U.S. Cl.
CPC .............. *B67C 3/2614* (2013.01); *B67C 3/08* (2013.01); *B67C 3/10* (2013.01); *B67C 3/12* (2013.01); *G01F 1/582* (2013.01); *G01M 3/3272* (2013.01); *B67C 2003/2671* (2013.01)

(58) Field of Classification Search
CPC ........... B67C 3/2614; B67C 3/08; B67C 3/10; B67C 3/12; G01F 1/582
See application file for complete search history.

(56) References Cited

U.S. PATENT DOCUMENTS

| | | | | |
|---|---|---|---|---|
| 4,949,764 A | * | 8/1990 | Clusserath | ............... B67C 3/06 141/39 |
| 6,213,169 B1 | | 4/2001 | Clusserath | |
| 6,474,368 B2 | | 11/2002 | Clusserath et al. | |
| 2016/0025267 A1 | * | 1/2016 | Clusserath | ............... B67C 3/10 141/4 |

FOREIGN PATENT DOCUMENTS

| | | |
|---|---|---|
| DE | 42 39 238 | 5/1994 |
| DE | 29 718 084 | 11/1997 |
| EP | 0 582 190 | 2/1994 |
| EP | 1 162 167 | 12/2001 |
| EP | 2 213 997 | 8/2010 |
| WO | WO 20051056464 | 6/2005 |

* cited by examiner

Primary Examiner — Timothy L Maust
Assistant Examiner — Timothy P Kelly
(74) Attorney, Agent, or Firm — Occhiuti & Rohlicek LLP

(57) ABSTRACT

An apparatus for processing a container that contains liquid filling-material includes a source of inert gas at a treatment pressure that is higher than a fill pressure that is used to fill said container, and filling elements. A typical filling element includes a housing, and a first controlled gas path that selectively connects the source to the container.

20 Claims, 3 Drawing Sheets

METHOD AND FILLING SYSTEM FOR FILLING CONTAINERS

RELATED APPLICATIONS

This application is the national stage of PCT/EP2013/002924, filed on Sep. 28, 2013, which claims the benefit of the Mar. 14, 2013 priority date of DE 102013102616.8, the contents of which are herein incorporated by reference.

FIELD OF INVENTION

The invention relates to container processing, and in particular, to processing a filled or partially-filled container.

BACKGROUND

Various methods and filling machines for filling containers are known. Among these are methods and filling machines for pressure-filling containers, including large-volume containers. These include plastic or PET containers or kegs with volumes of between 10 and 30 liters.

When one opens a bottle of beer, it is sometimes the case that considerable amounts of beer escape out of the top as a result of foaming. This results from the sudden pressure relief that occurs when one opens the bottle. A known way to avoid this is to open the beer very slowly, by carefully prying off the cap.

A similar difficulty arises in pressure filling a carbonated beverage. During pressure relief, a similar foaming can occur. It is known to reduce or avoid such unwanted foaming by lengthening the pressure-relief phase. However, this reduces the rate at which kegs can be filled and closed.

Large plastic containers are not always made perfectly. To test the containers, it is known to fill them with high-pressure gas to look for leaks. This testing is carried out on empty containers.

Sometimes, a container will burst during this testing. Because of the size of the container and the pressure of the gas, the container in this case is effectively like a small bomb. As a result, there can be considerable damage to machines and installations. Even worse, the extremely loud bang that occurs can lead to hearing damage in those people who are unfortunate enough to be near the container when it bursts.

SUMMARY OF THE INVENTION

An object of the invention is to provide an apparatus and method that avoids or reduces the foregoing disadvantages while filling a great many containers in a short time interval.

According to a first aspect of the invention, a pressure-treatment phase follows pressure-filling a container. This includes raising internal pressure of the container to a treatment pressure that is clearly above the filling pressure. Such a rise is achieved by subjecting the head space of the filled container, which is the space that is not occupied by the filling-material, with a treatment gas under pressure. The treatment gas is an essentially inert gas, for example carbon-dioxide gas or nitrogen.

As a result of the treatment pressure applied during this pressure-treatment phase, the internal pressure of the container rises. In some practices of the invention, it rises by between 0.5 bar and 5.0 bar. In others, it rises between 0.5 bar and 3.0 bar.

The pressure-treatment phase does not last long. In some practices of the invention, the pressure treatment phase is shorter than the duration of the filling phase. In other practices of the invention, it is between 0.5 and 10 seconds. In still other practices of the invention, it is between 0.5 and 3.0 seconds.

A temporary rise in internal pressure to a treatment pressure, when carried out after pressure treatment, results in a surprising phenomenon when used with carbonated beverages. In particular, it results in an improved binding of the carbon-dioxide gas to the liquid filling-material.

This surprising result has several applications in the filling of containers. For example, pressure-filling a container is typically followed by a pressure release. This pressure release can result in undesired foaming. However, temporarily raising internal pressure immediately after filling has the surprising effect of suppressing foaming. This, in turn, shortens the time required to fill and seal a container, thus allowing greater throughput.

According to a further aspect of the invention, a pressure test of the particular container during the filling process is carried out once the container is partially filled with the liquid filling-material. As a result, the volume filled with high-pressure gas is much smaller than the total volume of the container. In some practices, the volume filled with high-pressure gas is less than 20% of the total volume of the empty container.

The foregoing pressure test can be integrated into the filling process. For example, it can be included as an extra processing step just prior to pressure relief of the filled container to ambient pressure. In some practices, the test pressure is between 1.5 times and 2.5 times the filling pressure. In some practices, the test pressure is twice the filling pressure.

An advantage is that pressure-testing for leaks is can be carried out at the same time in a container that only has a small volume of gas. If the container happens to burst, only a small amount of high-pressure gas is involved. This reduces the risk of property damage and personal injury that might otherwise result form failure, bursting or splitting of the container.

In a preferred practice of the invention, the pressure test does not take place until the end of the actual filling phase of the filling process. As a result, only an extremely low volume in the head space of the container is subjected to the pressurized gas at the test pressure. In this practice, the pressure test takes place preferably during the pressure-treatment phase to improve the carbon-dioxide binding, i.e. the treatment pressure is also used as the test pressure for the pressure test.

The invention is based in part on the realization that the savings arising from the reduction in the quantity of treatment gas or test gas and from the lack of a need for safety measures against splitting or exploding containers are higher than the costs that result from losing the occasional container and its filling-material.

The gas used to subjecting the container's head space preferably comes from a separate source that supplies the inert gas used as the treatment gas or test gas, or from a channel admits treatment gas or test gas at treatment or test pressure in response to actuating a control valve provided in the filling element. In some cases, the treatment or test pressure is freely selectable. In others, it is set during the pressure treatment to improve the carbon-dioxide binding. For example, it can be set to be is greater than the filling pressure that is used in pressure-filling containers.

Whether carried out alone or with pressure treatment to improve the carbon-dioxide binding, pressure testing is carried out such that the container is subjected to a treatment or test pressure that is then cut off by disconnecting the container's interior from the source of the pressure. The pressure is them monitored for some test interval. If it remains constant, as it should if the container has no leaks, the pressure should remain constant. If, during this test interval, the pressure begins to droop, the container is regarded as possibly leaking, and appropriate remedial action, such as discarding it, can be taken.

The advantages of the invention thus consist of an improvement in the carbon-dioxide binding with filling-material containing carbon-dioxide, i.e. carbonated filling-material, and when the pressure test is carried out, of a reduction in the risk of damage and harm to health during the pressure testing. Due to the reduced volume to be subjected to the treatment gas, there arises furthermore a considerable saving of this gas and a considerable reduction in the total duration of the pressure treatment and pressure testing compared to the pressure testing of empty containers.

In one aspect, the invention features a method for processing a container that has been pre-tensioned, the container being in a sealed position against a filling element. Such a method includes pressure-filling the container with liquid filling-material, the container being maintained at a filling pressure. Then, upon completion of the pressure-filling, while the container is in the sealed position, a pressure-treatment of the liquid filling-material is carried out. This is followed by relieving pressure in the container to ambient pressure. Carrying out the pressure treatment includes raising internal pressure in the container to a treatment pressure that is higher than the filling pressure, and raising the internal pressure includes introducing gas into a head space of the container.

In some practices, carrying out the pressure treatment includes carrying out the pressure treatment for an interval that is shorter than a time required for completion of the pressure-filling.

In other practices, carrying out the pressure treatment includes carrying out the pressure treatment for an interval that is between 0.5 seconds and 3 seconds.

Some practices also include maintaining the treatment pressure to be between 1.5 times the filling pressure and 2.5 times the filling pressure.

In still other practices, carrying out pressure treatment includes causing a pressure rise of between 0.5 bar and 3.0 bar in the interior.

Some practices also include, prior to pressure-filling the container with liquid filling-material, causing gas to pass into the container from a gas reservoir, and, after causing the gas to pass into the container, returning gas that is in the container to the gas source.

In some practices, introducing gas into the head space includes introducing either carbon-dioxide, nitrogen, or sterile air.

In another aspect, the invention features method for processing a container. Such a method includes, during a filling phase, filling an interior of the container with liquid content, when the container has been filled to a designated level, ceasing filling, and testing the container for leaks. In these practices, testing the container for leaks includes connecting the interior to a gas source, allowing the gas source to fill the interior until a pressure within the interior reaches a treatment pressure, disconnecting the source from the interior, and, during the course of a testing interval, monitoring for evidence of leakage from the container.

In some practices, monitoring for evidence of leakage includes monitoring a rate of change of pressure within the container.

In other practices, monitoring for evidence of leakage includes inspecting an outer surface of the container. Among these are practices that include using a camera for inspecting the outer surface.

In yet other practices, monitoring for evidence of leakage includes using a pressure sensor to monitor pressure in the container.

Also among the practices of the invention are those that include testing the container for leaks while the container is sealed against a filling element.

Additional practices include those in which the treatment pressure is greater than a filling pressure used in pressure-filling the container. Among these practices are those in which the treatment pressure is between 1.5 times the filling pressure and 2.5 times the filling pressure.

In some practices, connecting the interior to a gas source includes connecting the interior to a channel that transports a treatment gas at the treatment pressure.

In other practices, the designated level is selected such that filling is completed prior to testing the container for leaks.

Yet other practices include determining that no leak is present, and resuming filling of the container.

In another aspect, the invention features an apparatus for processing a container that contains liquid filling-material. Such an apparatus includes a source of inert gas at a treatment pressure that is higher than a fill pressure that is used to fill the container, and a plurality of filling elements, each of which provides controlled dispensing of liquid content into the container. A typical filling element includes a housing, and a first controlled gas path formed in the housing. This first controlled gas path selectively connects the source with the container.

In some embodiments, the source includes a joint channel that connects to each filling element in the plurality of filling elements.

Other embodiments include a second controlled gas path, and a collection chamber. The collection chamber is connected to all filling elements in the plurality of filling elements. The second controlled gas path is selectively connected to the collection chamber such that an interior of the container can be selectively connected to the collection chamber. It is also configured to permit escape of gases used in rinsing and pre-tensioning of the containers.

As used herein, "free-jet filling" means a method in which the liquid filling-material flows into the container to be filled in a free-filling jet and in which the container mouth or the opening of the container does not lie against the filling element. Instead, it is located as some distance from either the filling element or the outlet.

As used herein, the expression "substantially" or "approximately" means deviations from the exact value by ±10%, and preferably by ±5% and/or deviations in the form of changes not significant for function.

As used herein, "pressure filling" means a filling method in which the container to be filled is sealed against a filling element. In some cases, the container is also pre-tensioned before the actual filling phase. In other cases, the container is pretensioned before the liquid valve is opened. Pretensioning is carried out by one or more controlled gas paths that are formed in the filling element and that conduct a pressurized gas at a filling pressure. The gas in some cases is an inert gas. In other cases, it is carbon-dioxide gas. As liquid flows into the container to fill it, it also forces this gas out of the container interior. The gas flows out a controlled gas path formed in the filling element.

Further treatment phases can precede this pre-tensioning phase. For example it is also possible to evacuate and/or treat the container with an inert gas, such as carbon-dioxide gas. This can be carried out using gas paths formed in the filling element.

As used herein, "container in a sealed position with the filling element" means that the container is pressed with its container mouth tightly onto the treatment head or onto the filling element or onto a seal there.

Further developments, benefits and application possibilities of the invention arise also from the following description of examples of practices of the invention and from the figures. Moreover, all characteristics described and/or illustrated individually or in any combination are the subject of the invention, regardless of their inclusion in the claims or reference to them. The content of the claims is also an integral part of the description.

BRIEF DESCRIPTION OF THE DRAWINGS

These and other features of the invention will be apparent from the following detailed description and the accompanying figures, in which.

DETAILED DESCRIPTION

Figure 1:
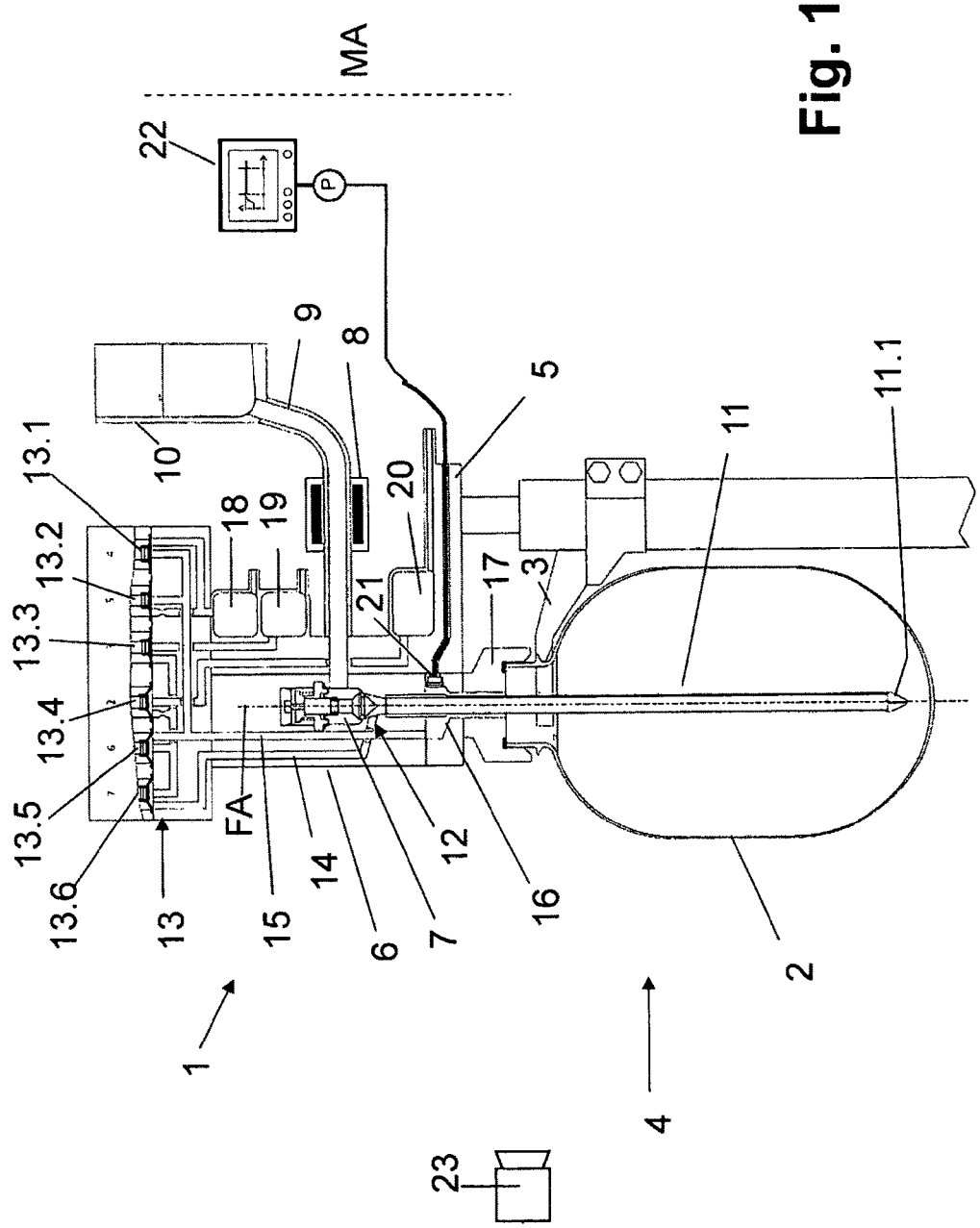
FIGS. 1 and 2 show alternative embodiments of a filling element of a filling point of a filling system for pressure-filling large-volume containers.

FIG. 1 shows a filling element 1 of a rotary filling machine used for pressure-filling a large-volume container 2, such as a plastic or PET keg. The filling element 1 and an associated container carrier 3 define a filling point 4. This filling point 4 is one of many identical filling points that are disposed around the periphery of a rotor 5 that is driven to rotate about a machine axis MA.

A vat 10 that is common to all the filling points 4 is on the rotor 5. The vat 10 is partially filled with the liquid filling-material. The space within the vat 10 that is not occupied by the liquid filling-material is filled with an inert gas that is maintained at a filling pressure PF. Examples of inert gas include carbon-dioxide and nitrogen.

During filling, the container carrier 3 suspends the container 2 and presses an edge of its container opening so that it is sealed against the filling element 1.

The filling element 1 has a housing 6 in which is formed a liquid-carrying channel 7 that is connected, at an upper end thereof, to the vat 10 by a product pipe 9. An in-line flow meter 8 in the product pipe 9 measures flow through the pipe 9.

The liquid-carrying channel 7 continues on into a filling pipe 11 that is coaxial with a vertical filling element axis FA. The filling pipe 11 extends deep into the container 2 almost all the way to the container's base. A distal end of the filling pipe 11 near the container's base forms a discharge opening 11.1 for the liquid filling-material.

A liquid-dispensing valve 12 is disposed along the liquid-carrying channel 7. During the filling phase, the liquid-dispensing valve 12 opens to dispense liquid into the container 2. It then closes once the required quantity of liquid filling-material has been dispensed. The liquid-dispensing valve 12 opens and closes based at least in part on a signal from the flow meter 8.

The housing 6 contains multiple gas channels. These include a first gas-channel 14 and a second gas-channel 15.

The first gas-channel 14 opens into the liquid-carrying channel 7 just downstream of the liquid-dispensing valve 12. The second gas-channel 15 opens into an annular gas-space 16 that surrounds the filling pipe 11 and that forms an annular opening on the underside of the filling element 1 or on a centering bell 17 located on the underside of the filling element 1. As a result, when the container 2 is against the underside of the filling element 1, the annular gas-space 16 connects with the container's interior.

The housing 6 also includes a control valve arrangement 13 having a first control-valve 13.1, a second control-valve 13.2, a third control-valve 13.3, a fourth control-valve 13.4, a fifth control-valve 13.5, and a sixth control-valve 13.6, all of which control gas flow within the gas channels of the filling element 1. These control valves 13.1-13.6 are preferably pneumatically actuated valves that are actuated by electro-pneumatic valves. The operation of these control valves 13.1-13.6 is described more fully below in connection with the pressure-filling operation.

The rotor 5 also includes first, second, and third annular-channels 18, 19, 20 that are connected to all the filling elements 1 of the filling system. The control valves 13.1-13.6 selectively connect these annular channels 18, 19, 20 to the first and second gas-channels 14, 15 and thus to either the liquid-carrying channel 7 or to the annular gas-space 16. These annular channels 18, 19, 20 supply inert gas at an elevated pressure or receive inert gas that is returned during pressure-filling of a container.

In the following description of the filling procedure, the control valves 13.1-13.6 are always closed unless stated otherwise.

The first step is that of rinsing the containers 2. This is carried out with the liquid-dispensing valve 12 closed and the first, second, fourth, and sixth control valves 31.1, 13.2, 13.4, 13.6 open. The container is pressed in a sealed position against the filling element 1 or against the centering bell 17. The third annular-channel 20 supplies an inert rinsing gas under pressure through the filling pipe 11. This rinsing gas forces any air that is in the container 2 out into the first annular-channel 18.

Alternatively, pressurized rinsing gas can be supplied by the second annular-channel 19. This is carried out with the liquid-dispensing valve 12 is closed, and the first, second, third, and sixth control valves 13.1, 13.2, 13.3, 13.6 are opened. This rinsing gas forces any air that is in the container 2 out into the first annular-channel 18.

The next step is that of pre-tensioning the interior of the container. This is carried out with the liquid-dispensing valve 12 closed and the third and sixth control valves 13.3, 13.6 are opened. As a result, pressurized inert gas flows out of the second annular-channel 19, through the first gas-channel 14, through the filling pipe 11, and into the container's interior.

Alternatively, the third annular-channel 20 can serve as a source of pressurized gas. To carry out this pre-tensioning, the liquid-dispensing valve 12 closed, and the fourth and sixth control valves 13.4, 13.6 are opened. As a result, pressurized inert gas flows out of the third annular-channel 20, through the first gas-channel 14, through the filling pipe 11, and into the container 2.

The next step is that of actually pressure-filling a container 2. This is carried out with the liquid-dispensing valve 12, the third control-valve 13.3 and the fifth control-valve 13.5 all opened. As a result, liquid filling-material containing carbon-dioxide flow into the container in a sub layer through the filling pipe 11. This forces inert gas in the container 2 to be returned to the second annular-channel 19 through the annular gas-space 16 and the first gas-channel 14. Closing the liquid-dispensing valve 12 ends this filling phase.

Following the filling phase, the next step is to level the liquid filling-material in the container 2 and the filling pipe 11. This is carried out by opening the fifth and sixth control valves 13.5, 13.6 with the liquid-dispensing valve 12 closed.

Figure 2:
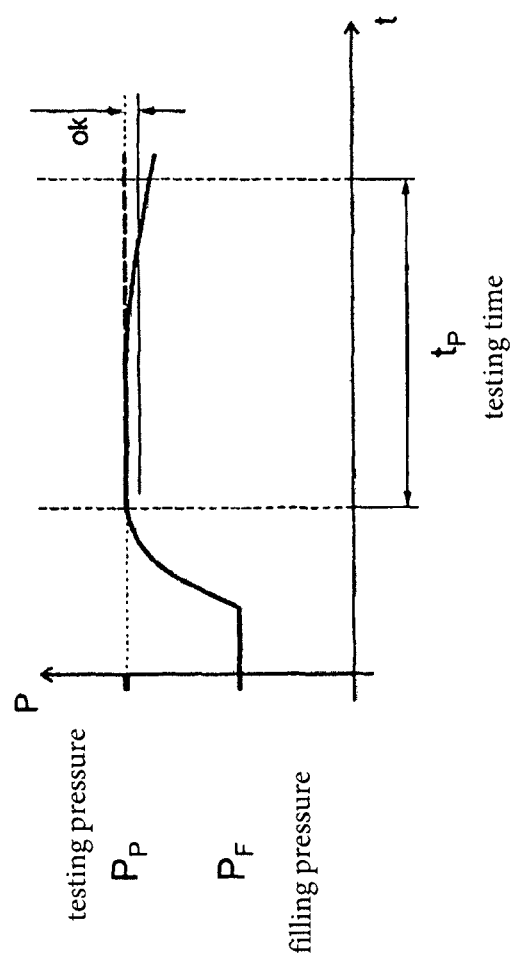

After the filling and leveling steps comes a step of pressure treating the container 2 to improve the carbon-dioxide binding. This takes place with the container 2 still sealed against the filling element. During the pressure treating step, the liquid-dispensing valve 12 is closed and the fourth, fifth, and sixth control valves 13.4-13.6 are opened. As a result, there is fluid communication between the first and second gas-channels 14, 15 and the head space in the container. This subjects the liquid filling-material to a treatment pressure PP lying clearly above the filling pressure PF from the third annular-channel 20, as is also illustrated in FIG. 2.

During pressure treatment, it is also possible to carry out pressure testing of the container 2. This pressure testing is carried out by closing the fourth, fifth, and sixth control valves 13.4-13.6 under time or pressure control. This interrupts the fluid communication between the container 2 and the third annular-channel 20.

Referring back to FIG. 1, a pressure sensor 21 is arranged in the annular gas-space 16. This pressure sensor 21 provides an electrical signal indicative of measured pressure to a measuring device 22.

After closing the fourth, fifth, and sixth control valves 13.4, 13.5, 13.6, the pressure sensor 21 measures the treatment pressure PP in the head space of the filled container 2 over a test time tP. A measuring device 22 monitors this signal.

If the measuring device 22 determines that the treatment pressure PP remains constant during the test time tP, one can infer that the filled container 2 is not leaking and can be sealed after the pressure relief. On the other hand, if the treatment pressure PP droops during the test period tP, one can infer that the container 2 is defective.

After the pressure treatment, the liquid dispensing valve 12 is closed, and the second, fifth, and sixth control-valves 13.2, 13.5, 13.6 are opened. This relieves pressure inside the container to ambient pressure. The container 2 is thus ready for removal from the filling element 1 by lowering the container carrier 3.

Naturally, with the filling system comprising the filling elements 1, further process steps are also possible, thus for example when the third annular-channel 20 supplies gas for pre-tensioning, it is possible to carry out a slow filling at the start of the filling phase and/or a slow braking at the end of the filling phase by opening the second control valve 13.2 with the first, third, fourth, fifth, and sixth control valves 13.1, 13.3-13.6 closed. This causes throttled return of inert gas forced out of the interior of the container and into the first annular-channel 18.

In the foregoing method, pressure testing of the containers 2 takes place when these containers 2 are already filled with the liquid filling-material up to a head space thereof. This head space is subjected to the high treatment-pressure PP from the third annular-channel 20, However, its volume is much lower than the total volume of the container 2.

In an alternative embodiment, a camera system 23 detects leaking filling-material during the pressure treatment. Preferably, the camera 23 is arranged outside the filling machine. This embodiment is particularly useful where any leaking filling-material tend to form foam, as is the case, for example, with beer.

In some embodiments, treatment gas under the treatment pressure PP is removed after the end of the pressure treatment into the second annular-channel 19, which usually serves to pre-tension the containers 2. This treatment gas is therefore not necessarily lost, but can instead be re-used for the preliminary rinsing and/or pre-tensioning.

Figure 3:
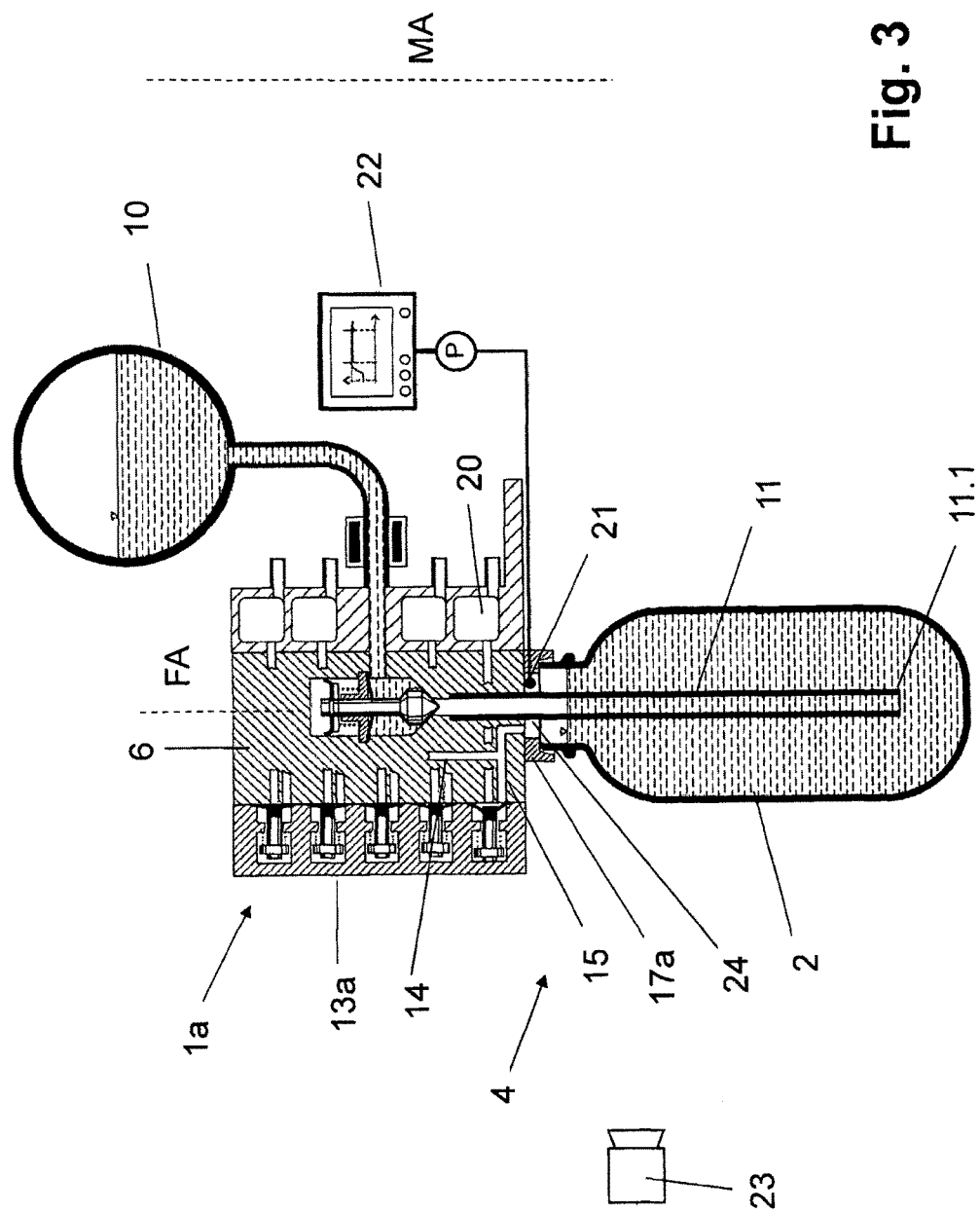
FIG. 3 shows pressure as a function of time during a combined pressure treatment and pressure test.

In an alternative filling element 1a, shown in FIG. 3, the first and second gas-channels 14, 15, which are among the controlled gas paths comprising the control valve installation 13, open into an annular joint-space 24 that encloses the filling pipe 11 and is open on the underside of the filling element 1a. As a result, when the container 2 is in a sealed position on the filling element 1a, the annular joint-space 24 is connected to the container's interior. In the illustrated embodiment, the annular joint-space 24 is formed by a centering bell 17a. The pressure sensor 21 is arranged in the annular joint-space 24.

During pressure treatment, the annular joint-space 24 connects to the third annular-channel 20 transporting the treatment gas or inert gas at treatment pressure PP by means of an open control valve of the control valve arrangement 13.

The method is not limited to the case of filling with a carbonated beverage. In fact, the method can be carried out in cases where an improvement of the carbon-dioxide binding is not necessary or possible, for example in the event of non-carbonated filling-material. When this is the case, the pressure testing takes place after the end of the filling phase by subjecting the head space of the container 2 to suitable pressure as described above.

Moreover, the pressure testing can also be carried out when the container is mostly but not completely filled with the liquid filling-material. This can be carried out regardless of whether the filling-material is carbonated or not. In this case, container filling is interrupted for pressure testing. If the container fails the test, it is discarded. If it passes the test, the pressure is relieved and filling resumes.

In the embodiments described thus far, pressure testing takes place during or after the end of a pressure filling phase, wherein the container is already in a sealed position with the filling valve during the pressure filling phase. However, this is not absolutely essential.

The principle of the invention is applicable to free-jet filling as well. In this case, after the container is partly filled, it is brought into engagement with a leak-test head and sealed for the test. The test then continues the same way as described above. Once the test is complete, the container is depressurized back to ambient pressure.

In the context of the present invention, it is irrelevant whether the container is or is not already fitted with a seal, for example with a fitting, at the time of the pressure test. If the container is already fitted with a seal, the pressure test and thus the leak test preferably also extend to the seal and/or the connection of the seal to the container. If the container is not yet fitted with a seal, the leak test extends solely to the container itself.

In the context of the present application, the terms "pressure test" and "leak test" are used synonymously as, in the context of the present application, the pressure test is used exclusively for leak testing.

Carbon-dioxide gas or nitrogen are suitable for use as pressure-treatment gas or inert gas. But, for the pressure test, sterile air is also suitable, provided that the pressure test is carried out without or separately from the pressure treatment to improve the carbon-dioxide binding.

Having described the invention, and a preferred embodiment thereof, what is claimed as new, and secured by Letters Patent is:

1. A method for processing a container that has been pre-tensioned, said container being in a sealed position against a filling element, said method comprising: pressure-filling said container with liquid filling-material, said container being maintained at a filling pressure; upon completion of said pressure-filling, while said container is in said sealed position, carrying out a pressure-treatment of said liquid filling-material; and relieving pressure in said container to ambient pressure; wherein carrying out said pressure treatment comprises raising internal pressure within an interior of said container to a treatment pressure that is higher than said filling pressure, wherein raising said internal pressure comprises introducing gas into a head space of said container, and wherein, after having raised said internal pressure, testing said container for leaks, wherein testing said container for leaks comprises connecting, wherein connecting comprises connecting said interior to a gas source, allowing said gas source to fill said interior until a pressure within said interior reaches said treatment pressure, disconnecting said source from said interior, and, during the course of a testing interval, monitoring for evidence of leakage from said container.

2. The method of claim 1, wherein carrying out said pressure treatment comprises carrying out said pressure treatment for an interval that is shorter than a time required for completion of said pressure-filling.

3. The method of claim 1, wherein carrying out said pressure treatment comprises carrying out said pressure treatment for an interval that is between 0.5 seconds and 3 seconds.

4. The method of claim 1, further comprising maintaining said treatment pressure to be between 1.5 times said filling pressure and 2.5 times said filling pressure.

5. The method of claim 1, wherein carrying out pressure treatment comprises causing a pressure rise within said interior, wherein said pressure rise is between 0.5 bar and 3.0 bar.

6. The method of claim 1, further comprising, prior to pressure-filling said container with liquid filling-material, causing gas to pass into said container from a gas reservoir, and, after causing said gas to pass into said container, returning gas that is in said container to said gas reservoir.

7. The method of claim 1, wherein introducing gas into said head space comprises introducing a gas selected from the group consisting of carbon dioxide, nitrogen, and sterile air.

8. The method of claim 1, wherein monitoring for evidence of leakage comprises monitoring a rate of change of pressure within said container.

9. The method of claim 1, wherein monitoring for evidence of leakage comprises inspecting an outer surface of said container.

10. The method of claim 9, further comprising using a camera for inspecting said outer surface.

11. The method of claim 1, wherein monitoring for evidence of leakage comprises, using a pressure sensor, monitoring pressure in said container.

12. The method of claim 1, wherein testing said container for leaks occurs with said container arranged in said sealed position against said filling element.

13. The method of claim 1, wherein said treatment pressure is greater than said filling pressure used in pressure-filling said container.

14. The method of claim 13, wherein said treatment pressure is between 1.5 times said filling pressure and 2.5 times said filling pressure.

15. The method of claim 1, wherein connecting comprises connecting said interior to a channel that transports a treatment gas at said treatment pressure.

16. The method of claim 1, wherein said designated level is selected such that filling is completed prior to testing said container for leaks.

17. The method of claim 1, further comprising determining that no leak is present, and resuming filling of said container.

18. An apparatus that has been specifically designed for carrying out a process of processing a container that has been pre-tensioned, said container being in a sealed position against a filling element, wherein processing said container comprises pressure-filling said container with liquid filling-material, said container being maintained at a filling pressure, upon completion of said pressure-filling, while said container is in said sealed position, carrying out a pressure-treatment of said liquid filling-material, and relieving pressure in said container to ambient pressure, wherein carrying out said pressure treatment comprises raising internal pressure in said container to a treatment pressure that is higher than said filling pressure, and wherein raising said internal pressure comprises introducing gas into a head space of said container, and wherein, after having raised said internal pressure, testing said container for leaks, wherein testing said container for leaks comprises connecting, wherein connecting comprises connecting said interior to a gas source, allowing said gas source to fill said interior until a pressure within said interior reaches said treatment pressure, disconnecting said source from said interior, and, during the course of a testing interval, monitoring for evidence of leakage from said container, wherein said apparatus comprises a source of said gas at said filling pressure, wherein said filling element is one of a plurality of filling elements, wherein a first filling element from said plurality of filling elements comprises a housing and a first controlled gas path, wherein said filling element provides controlled dispensing of liquid filling-material into said container, wherein said first controlled gas path is formed in said housing, and wherein said first controlled gas path selectively connects said source with said container, wherein said apparatus further comprises means for testing said container for leaks by connecting said interior to a gas source, said means for testing said container comprising means for allowing said gas source to fill said interior until a pressure within said interior reaches said treatment pressure, means for disconnecting said source from said interior, and means for monitoring for evidence of leakage from said container during a testing interval.

19. The apparatus of claim 18, wherein said source comprises a joint channel that connects to each filling element in said plurality of filling elements.

20. The apparatus of claim 18, further comprising a second controlled gas path, and a collection chamber, wherein said collection chamber is connected to all filling elements in said plurality of filling elements, wherein said second controlled gas path is selectively connected to said collection chamber such that an interior of said container can be selectively connected to said collection chamber, wherein said second controlled gas path is configured to permit escape of gases used in rinsing and pre-tensioning of said containers.

\* \* \* \* \*